United States Patent
Melzer et al.

(10) Patent No.: US 11,681,013 B2
(45) Date of Patent: Jun. 20, 2023

(54) RADAR SYSTEM COMPRISING A PLURALITY OF RADAR CHIPS

(71) Applicant: Infineon Technologies AG, Neubiberg (DE)

(72) Inventors: Alexander Melzer, Neutillmitsch (AT); Clemens Pfeffer, Linz (AT)

(73) Assignee: Infineon Technologies AG, Neubiberg (DE)

( * ) Notice: Subject to any disclaimer, the term of this patent is extended or adjusted under 35 U.S.C. 154(b) by 192 days.

(21) Appl. No.: 16/886,233

(22) Filed: May 28, 2020

(65) Prior Publication Data
US 2020/0386854 A1 Dec. 10, 2020

(30) Foreign Application Priority Data

Jun. 5, 2019 (DE) .......................... 102019115107.4

(51) Int. Cl.
| | | |
|---|---|---|
| G01S 7/32 | (2006.01) | |
| G01S 7/35 | (2006.01) | |
| G01S 7/03 | (2006.01) | |
| G01S 13/58 | (2006.01) | |
| G01S 13/32 | (2006.01) | |

(Continued)

(52) U.S. Cl.
CPC ................ G01S 7/032 (2013.01); G01S 7/35 (2013.01); *G01S 7/03* (2013.01); *G01S 7/352* (2013.01); *G01S 13/003* (2013.01); *G01S 13/32* (2013.01); *G01S 13/343* (2013.01); *G01S 13/583* (2013.01);
(Continued)

(58) Field of Classification Search
CPC .......... G01S 7/032; G01S 7/35; G01S 13/003; G01S 13/343; G01S 13/584; G01S 13/878; G01S 13/931; G01S 13/32; G01S 7/03; G01S 7/352; G01S 13/583
See application file for complete search history.

(56) References Cited

U.S. PATENT DOCUMENTS

| | | | |
|---|---|---|---|
| 6,501,942 B1 * | 12/2002 | Weissman .............. | H04B 7/155 455/14 |
| 2007/0242775 A1 * | 10/2007 | Cheng ..................... | H04L 27/20 375/308 |

(Continued)

FOREIGN PATENT DOCUMENTS

| | | |
|---|---|---|
| DE | 202018105377 U1 | 12/2018 |
| DE | 102018117688 A1 | 2/2019 |

*Primary Examiner* — Timothy A Brainard
*Assistant Examiner* — Ismaaeel A. Siddiquee
(74) *Attorney, Agent, or Firm* — Harrity & Harrity, LLP

(57) ABSTRACT

A radar system and a method for a radar system are described. In accordance with one exemplary embodiment, the method includes generating a local oscillator signal in a first radar chip, generating a frequency-divided signal from the local oscillator signal by means of a frequency divider arranged in the first radar chip, transmitting the frequency-divided signal to a second radar chip, and transmitting the local oscillator signal to the second radar chip. The local oscillator signal received in the second radar chip is fed to an output channel of the second radar chip, which generates an output signal on the basis thereof. The method further includes generating—on the basis of the output signal of the output channel and the frequency-divided signal received by the second radar chip—a signal indicating a phase angle of the output signal relative to the received frequency-divided signal.

24 Claims, 7 Drawing Sheets

(51) Int. Cl.
 G01S 13/931 (2020.01)
 G01S 13/34 (2006.01)
 G01S 13/00 (2006.01)
 G01S 13/87 (2006.01)

(52) U.S. Cl.
 CPC ........... *G01S 13/584* (2013.01); *G01S 13/878* (2013.01); *G01S 13/931* (2013.01)

(56) References Cited

U.S. PATENT DOCUMENTS

| | | | |
|---|---|---|---|
| 2016/0077196 A1* | 3/2016 | Dehlink | G01R 31/2822 342/169 |
| 2018/0031688 A1* | 2/2018 | Hesse | G01S 7/4008 |
| 2019/0131981 A1* | 5/2019 | Vaucher | H03L 7/0992 |
| 2020/0025899 A1 | 1/2020 | Starzer et al. | |

* cited by examiner

RADAR SYSTEM COMPRISING A PLURALITY OF RADAR CHIPS

RELATED APPLICATION

This application claims priority to German Patent Application No. 102019115107.4, filed on Jun. 5, 2019, which is incorporated herein by reference in its entirety.

FIELD

The present description relates to the field of radio frequency (RF) circuits. Some exemplary embodiments relate to a device comprising two or more cascaded monolithic microwave integrated circuits (MMICs), which can be used e.g. in radar sensors/sensor systems, and to a method for measuring the phases of the emitted RF signals.

BACKGROUND

Radio-frequency (RF) transmitters and receivers are used in a multiplicity of applications, particularly in the field of wireless communication and radar sensors. In the automotive field there is an increasing need for radar sensors which can be used, inter alia, in driver assistance systems (Advanced driver assistance systems, ADAS) such as e.g. in cruise control (ACC, Adaptive Cruise Control, or Radar Cruise Control) systems. Such systems can automatically adapt the speed of an automobile in order thus to maintain a safe distance from other automobiles ahead (and also from other objects and pedestrians). Further applications in the automotive field are e.g. blind spot detection, lane change assist and the like. In the field of autonomous driving, radar sensors and systems comprising a plurality of sensors will play an important part for the control of autonomous vehicles.

Modern radar systems use large-scale integrated RF circuits which can combine all core functions of an RF front end of a radar transceiver in a single housing (single-chip radar transceiver). Such large-scale integrated RF circuits are usually referred to as MMICs. An RF front end usually (but not necessarily) includes, inter alia, a voltage controlled oscillator (VCO) connected in a phase locked loop, power amplifiers (PAs), directional couplers, mixers and associated control circuit arrangements for controlling and monitoring the RF front end. An MMIC can also comprise circuits for the analog signal processing in baseband (or an intermediate frequency band) and analog-to-digital converters (ADCs), in order to enable digital signal processing.

In sensor applications, a plurality of MMICs can also be interconnected (cascaded), for example in order to emit and/or to receive RF radar signals via a plurality of antennas. Such arrangements comprising a plurality of MMICs and a plurality of antennas can be used for beam forming techniques, for example. A plurality of transmitting and receiving antennas are necessary, inter alia, if the angle of incidence of the received radar echoes (DoA, Direction of Arrival) is intended to be ascertained. In order to enable a reliable measurement, the phases of the emitted RF radar signals must be in a defined relationship to one another. A calibration of the phases necessitates a phase measurement, which poses a certain challenge at frequencies in the EHF (Extremely High Frequency) range.

SUMMARY

A radar system and a method for a radar system are described. In accordance with one exemplary embodiment, the method includes generating a local oscillator signal in a first radar chip, generating a frequency-divided signal from the local oscillator signal by means of a frequency divider arranged in the first radar chip, transmitting the frequency-divided signal to a second radar chip (2), and transmitting the local oscillator signal to the second radar chip. The local oscillator signal received in the second radar chip is fed to an output channel of the second radar chip, which generates an output signal on the basis thereof. The method further includes generating—on the basis of the output signal of the output channel and the frequency-divided signal received by the second radar chip—a signal indicating a phase angle of the output signal relative to the received frequency-divided signal.

In accordance with a further exemplary embodiment, the method includes generating a local oscillator signal in a first radar chip, and transmitting the local oscillator signal to the second radar chip, wherein the local oscillator signal received in the second radar chip is fed to an output channel of the second radar chip, which generates an output signal on the basis thereof. The method furthermore includes generating a frequency-divided signal on the basis of the output signal of the output channel by means of a frequency divider arranged in the second radar chip, transmitting the frequency-divided signal to the first radar chip, and generating—on the basis of the frequency-divided signal received in the first radar chip and the local oscillator signal—a signal indicating a phase angle of the received frequency-divided signal relative to the local oscillator signal.

In accordance with one exemplary embodiment, the radar system includes a first radar chip having a local oscillator, which is configured to provide a local oscillator signal at its output. The first radar chip includes a first frequency divider, which is coupled to the output of the local oscillator and is configured to provide a frequency-divided signal on the basis of the local oscillator signal at its output. The system furthermore includes a second radar chip having a first input for receiving the local oscillator signal from the first radar chip, and having a second input for receiving the frequency-divided signal from the first radar chip. The second radar chip includes an output channel, to which the local oscillator signal received at the first input is fed in order to generate a corresponding output signal, and a circuit configured to generate, on the basis of the output signal of the output channel and the received frequency-divided signal, a signal indicating a phase angle of the output signal relative to the received frequency-divided signal.

In accordance with a further exemplary embodiment, the radar system includes a first radar chip having a local oscillator, which is configured to provide a local oscillator signal at an output, and a second radar chip having an input for receiving the local oscillator signal from the first radar chip, having an output channel, to which the local oscillator signal received at the first input is fed in order to generate a corresponding output signal, having a frequency divider configured to generate a frequency-divided signal on the basis of the output signal of the output channel, and having an output for transmitting the frequency-divided signal to the first radar chip. The first radar chip includes an input for receiving the frequency-divided signal from the second radar chip and also a circuit configured to generate, on the basis of the local oscillator signal and the received frequency-divided signal, a signal indicating a phase angle of the received frequency-divided signal relative to the local oscillator signal.

BRIEF DESCRIPTION OF THE DRAWINGS

Exemplary embodiments are explained in greater detail below with reference to figures. The illustrations are not necessarily true to scale and the exemplary embodiments are not restricted only to the aspects illustrated. Rather, importance is attached to illustrating the principles underlying the exemplary embodiments. In the figures.

DETAILED DESCRIPTION

Figure 1:
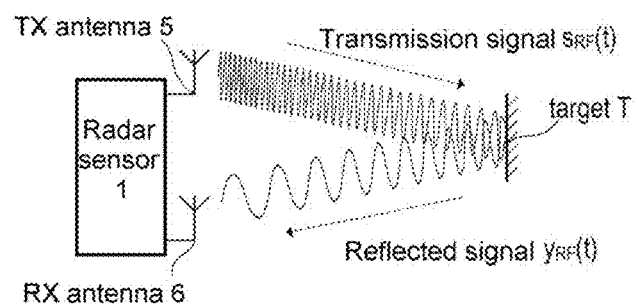
FIG. 1 is a schematic diagram for illustrating the functional principle of an FMCW radar system for distance and/or speed measurement.

FIG. 1 illustrates the application of an FMCW radar system as sensor for the measurement of distances and speeds of objects, which are usually referred to as radar targets. In the present example, the radar device 1 comprises separate transmitting (TX) and receiving (RX) antennas 5 and 6, respectively (bistatic or pseudo-monostatic radar configuration). It should be noted, however, that one antenna can also be used, which serves simultaneously as transmitting antenna and as receiving antenna (monostatic radar configuration). The transmitting antenna 5 emits an RF signal $s_{RF}(t)$, which is frequency-modulated for example with a linear chirp signal (periodic, linear frequency ramp). The emitted signal $s_{RF}(t)$ is backscattered at the radar target T and the backscattered (reflected) signal $y_{RF}(t)$ is received by the receiving antenna 6. FIG. 1 shows a simplified example; in practice, radar sensors are systems comprising a plurality of transmitting (TX) and receiving (RX) channels, and the RF signal $s_{RF}(t)$ includes a sequence of chirps. Examples of MIMO (multiple-input/multiple-output) radar systems will be discussed later with reference to FIGS. 5-9.

Figure 2:
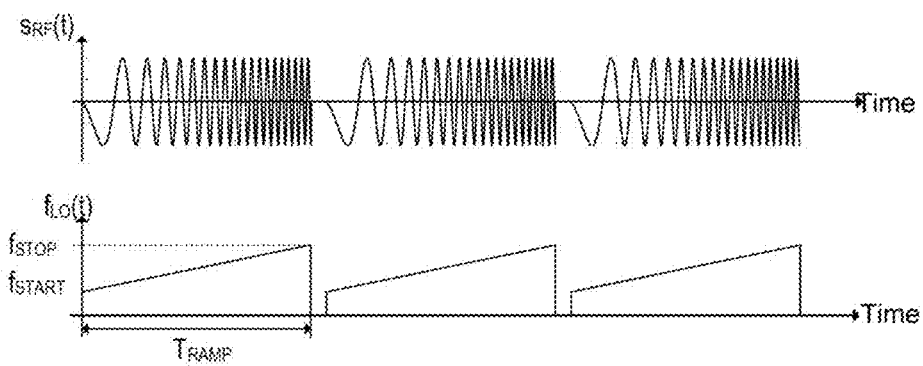
FIG. 2 comprises two timing diagrams for illustrating the frequency modulation of the RF signal generated by the FMCW system.

FIG. 2 illustrates by way of example the abovementioned frequency modulation of the signal $s_{RF}(t)$. As illustrated in FIG. 2, the signal $s_{RF}(t)$ is composed of a multiplicity of "chirps", that is to say that signal $s_{RF}(t)$ comprises a sequence of sinusoidal signal profiles (waveforms) having a rising (up-chirp) or falling (down-chirp) frequency (see upper diagram in FIG. 2). In the present example, the instantaneous frequency f(t) of a chirp beginning at a start frequency $f_{START}$ rises linearly within a time period $T_{RAMP}$ to a stop frequency $f_{STOP}$ (see lower diagram in FIG. 2). Such chirps are also referred to as linear frequency ramps. FIG. 2 illustrates three identical linear frequency ramps. It should be noted, however, that the parameters $f_{START}$, $f_{STOP}$, $T_{RAMP}$ and also the pauses between the individual frequency ramps can vary. The frequency variation also need not necessarily be linear.

Figure 3:
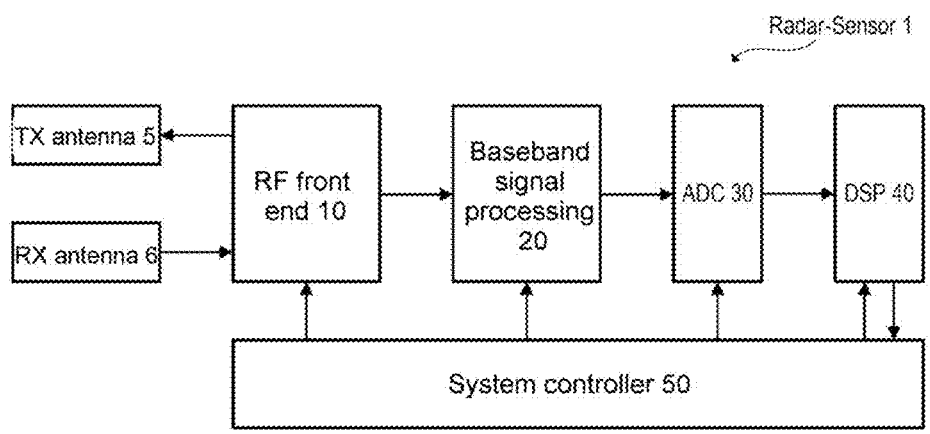
FIG. 3 is a block diagram for illustrating the fundamental structure of an FMCW radar system.

FIG. 3 is a block diagram which illustrates one possible structure of a radar device 1 (radar sensor) by way of example. Accordingly, at least one transmitting antenna 5 (TX antenna) and at least one receiving antenna 6 (RX antenna) are connected to an RF front end 10 which is integrated in an MMIC and which can include all those circuit components which are required for the RF signal processing. Said circuit components comprise for example a local oscillator (LO), RF power amplifiers, phase shifters, low-noise amplifiers (LNAs), directional couplers (e.g. rat race couplers, circulators, etc.) and mixers for down-converting the RF signals to baseband or an intermediate frequency band (IF band). The RF front end 10—if appropriate together with further circuit components—can be integrated in an MMIC (radar chip). The example illustrated shows a bistatic (or pseudo-monostatic) radar system comprising separate RX and TX antennas. In the case of a monostatic radar system, a single antenna would be used both for emitting and for receiving the electromagnetic (radar) signals. In this case, a directional coupler (e.g. a circulator) can be used to separate the RF signals to be emitted from the RF signals (radar echoes) received. As mentioned, radar systems in practice usually comprise a plurality of transmitting and receiving channels having a plurality of transmitting and receiving antennas, respectively, which makes it possible, inter alia, to measure the direction (DoA, direction of arrival) from which the radar echoes are received. This direction is usually represented by an angle (azimuth angle). In MIMO systems of this type, the individual TX channels and RX channels are usually constructed identically or similarly in each case. That is to say that the radar front end 10 can comprise a multiplicity of transmitting and receiving channels which can be distributed among a plurality of radar chips.

In the case of a frequency-modulated continuous-wave radar system (FMCW radar system), the RF signals emitted via the TX antenna 5 can lie e.g. in the range of approximately 20 GHz to 100 GHz (e.g. around 77 GHz in some applications). As mentioned, the RF signal received by the RX antenna 6 comprises the radar echoes, i.e. those signal components which are backscattered at one or at a plurality of radar targets. The received RF signal $y_{RF}(t)$ is e.g. down-converted to baseband and processed further in baseband by means of analog signal processing (see FIG. 3, analog baseband signal processing chain 20). The analog signal processing mentioned substantially comprises filtering and, if appropriate, amplification of the baseband signal. The baseband signal is finally digitized (see FIG. 3, analog-to-digital converter 30) and processed further in the digital domain. The digital signal processing chain can be realized at least partly as software which can be executed on a processor, for example a microcontroller or a digital signal processor (see FIG. 3, DSP 40). The overall system is generally controlled by means of a system controller 50, which can likewise be implemented at least partly as software which can be executed on a processor such as e.g. a microcontroller. The RF front end 10 and the analog baseband signal processing chain 20 (and optionally also the analog-to-digital converter 30 and parts of the digital signal processing) can be jointly integrated in a single MMIC (i.e. an RF semiconductor chip). Alternatively, the individual components can also be distributed among a plurality of integrated circuits.

Figure 4:
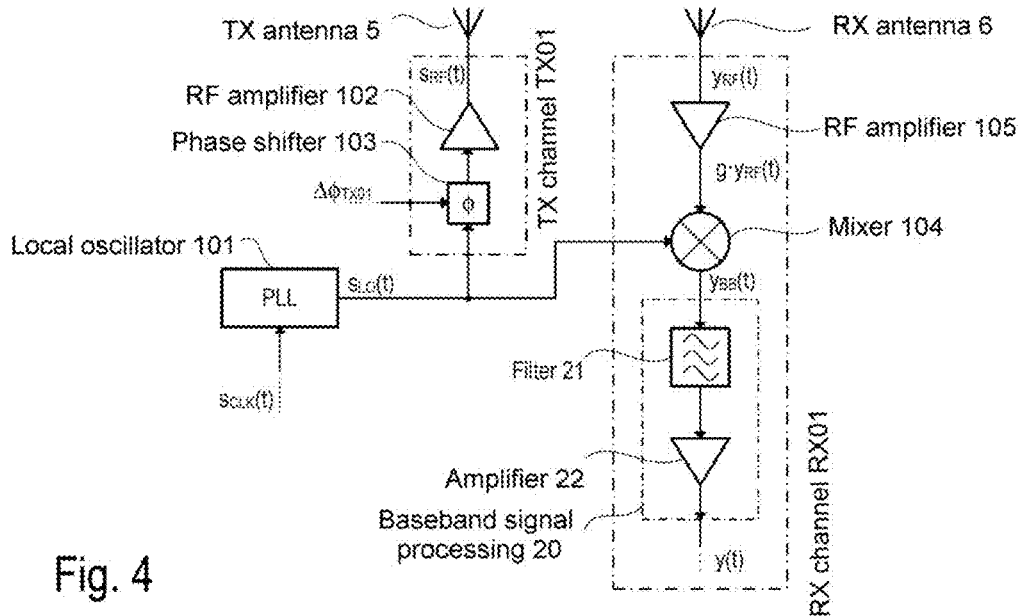
FIG. 4 is a simplified block diagram for illustrating an exemplary implementation of a transmitting channel and of a receiving channel of a radar system.

FIG. 4 illustrates an exemplary implementation of the RF front end 10 with baseband signal processing chain 20 connected downstream, which can be part of the radar sensor from FIG. 3. It should be noted that FIG. 4 illustrates a simplified circuit diagram in order to show the fundamental structure of the RF front end with one transmitting channel (TX channel TX01) and one receiving channel (RX channel RX01). Actual implementations, which may depend greatly on the specific application, can be more complex, of course, and generally comprise a plurality of TX and/or RX channels. The RF front end 10 comprises a local oscillator 101 (LO), which generates an RF oscillator signal $s_{LO}(t)$. The RF oscillator signal $s_{LO}(t)$, as described above with reference to FIG. 2, can be frequency-modulated and is also referred to as LO signal. In radar applications, the LO signal usually lies in the SHF (Super High Frequency, centimeter-wave) or in the EHF (Extremely High Frequency, millimeter-wave) band, e.g. in the interval of 76 GHz to 81 GHz or in the 24 GHz ISM band (Industrial, Scientific and Medical band) in some automotive applications.

The LO signal $s_{LO}(t)$ is processed both in the transmission signal path (in the TX channel) and in the reception signal path (in the RX channel). The transmission signal $s_{RF}(t)$ (cf. FIG. 2), emitted by the TX antenna 5, is generated by amplifying the LO signal $s_{LO}(t)$, for example by means of the RF power amplifier 102, and is thus merely an amplified version of the LO signal $s_{LO}(t)$. The phase shifter 103 can optionally bring about an additional adaptation of the phase of the transmission signal $s_{RF}(t)$ by a phase shift $\Delta\phi_{TX01}$. The output of the amplifier 102 can be coupled to the TX antenna 5 (in the case of a bistatic or pseudo-monostatic radar configuration). The reception signal $y_{RF}(t)$ received by the RX antenna 6 is fed to the receiver circuit in the RX channel and thus directly or indirectly to the RF port of the mixer 104. In the present example, the RF reception signal $y_{RF}(t)$ (antenna signal) is preamplified by means of the amplifier 103 (gain g). The amplified RF reception signal $g \cdot y_{RF}(t)$ is thus fed to the mixer 104. The amplifier 103 can be e.g. an LNA. The LO signal $s_{LO}(t)$ is fed to the reference port of the mixer 104, such that the mixer 104 down-converts the (preamplified) RF reception signal $y_{RF}(t)$ to baseband. The down-converted baseband signal (mixer output signal) is designated by $y_{BB}(t)$. Said baseband signal $y_{BB}(t)$ is firstly processed further in analog fashion, wherein the analog baseband signal processing chain 20 substantially brings about amplification (amplifier 22) and filtering (e.g. bandpass filter 21) in order to suppress undesired sidebands and image frequencies. The resulting analog output signal, which is fed to an analog-to-digital converter (see FIG. 3, ADC 30), is designated by y(t). Methods for the digital further processing of the output signal (digital radar signal y[n]) are known per se (for example range Doppler analysis) and therefore will not be discussed in further detail here.

In the present example, the mixer 104 down-converts the preamplified RF reception signal $g \cdot y_{RF}(t)$ (i.e. the amplified antenna signal) to baseband. The mixing can take place in one stage (that is to say from the RF band directly to baseband) or via one or more intermediate stages (that is to say from the RF band to an intermediate frequency band and further to baseband). In this case, the reception mixer 104 effectively comprises a plurality of individual mixer stages connected in series. In view of the example shown in FIG. 4, it becomes clear that the quality of a radar measurement depends greatly on the quality of the LO signal $s_{LO}(t)$, for example on the noise contained in the LO signal $s_{LO}(t)$, which is quantitatively determined by the phase noise of the local oscillator 101.

Figure 5:
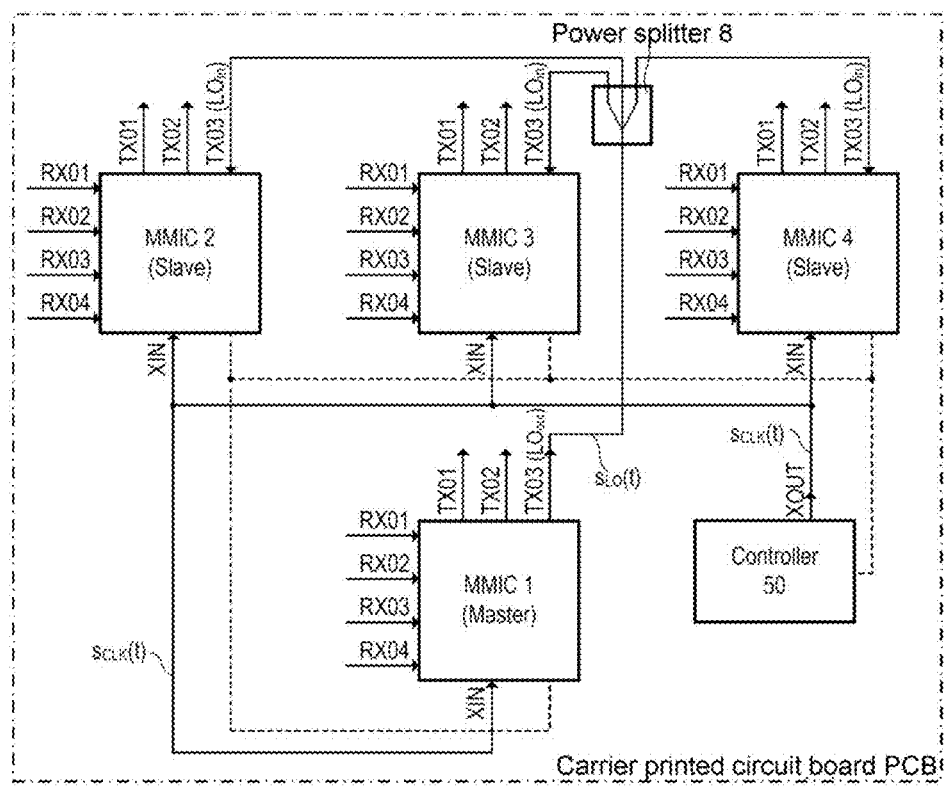
FIG. 5 is a block diagram for illustrating a system comprising a plurality of cascaded MMICs, wherein the local oscillator signal is generated by a master MMIC and distributed to the slave MMICs.

FIG. 5 is a block diagram illustrating by way of example a MIMO radar system comprising a plurality of coupled (cascaded) MMICs. In the example illustrated, four MMICs are arranged on a carrier PCB, for example a printed circuit board (PCB). Each MIMIC 1, 2, 3 and 4 can comprise a plurality of transmitting channels TX01, TX02, etc. and a plurality of receiving channels RX01, RX02, etc. The system can also comprise MMICs that include a plurality of transmitting channels, but no receiving channels. For the operation of the radar system it is important for the LO signals used by the MMICs to be coherent. Therefore, the LO signal is only generated in one MIMIC—the master MMIC 1—and distributed to the slave MMICs 2, 3 and 4. In the example illustrated, for this purpose, the LO signal $s_{LO}(t)$ is passed from an LO output $LO_{out}$ of the master MIMIC 1 to the input of a power splitter 8; the outputs of the power splitter are connected to LO inputs $LO_{in}$ of the respective slave MMICs 2, 3 and 4. The LO output $LO_{out}$ and the LO inputs $LO_{in}$ can be realized as pin, as solder ball, or suchlike, depending on the chip package. In some exemplary embodiments, the LO output $LO_{out}$ and/or the LO inputs $LO_{in}$ can be realized by dedicated external contacts (e.g. pin, solder ball, etc.). In order to keep the number of external contacts of the MMICs small, the output of a transmitting channel (e.g. channel TX03) can also be configured as LO output or alternatively as LO input. However, a transmitting channel configured as LO output or LO input is then no longer available as an antenna port for connection to a (transmitting) antenna. In accordance with the example illustrated in FIG. 5, in the master MIMIC 1, the RF output of the transmitting channel TX03 can be configured as LO output, for which purpose it is merely necessary to adapt the gain of the RF amplifier (cf. FIG. 4, amplifier 102). The resultant adaptation (reduction) of the signal power may be necessary or expedient in order to minimize the crosstalk to the receiving channels RX01, RX02, etc. (cf. FIG. 5) and in order to save energy. In the case of the slave MMICs 2, 3 and 4, the RF outputs of the respective transmitting channels TX03 are configured as LO inputs, which can be realized by means of couplers and/or switches.

In the example illustrated, the outputs designated by TX01 and TX02 can be connected to (transmitting) antennas and the inputs designated by RX01, RX02, RX03 and RX04 can be connected to (receiving) antennas. The connection between the MMICs and the power splitter 8 can be realized e.g. by means of (e.g. differential) strip lines on the carrier printed circuit board PCB. The power splitter 8 can also be realized by means of strip lines on the carrier printed circuit board PCB (e.g. as a Wilkinson splitter). It should be pointed out at this juncture that all the MMICs can comprise local oscillators 101 (e.g. PLLs), but the latter are not usually used in the MMICs 2-4 configured as slaves. For normal radar operation, the LO signal $s_{LO}(t)$ is generated centrally in the master MIMIC and distributed among the slave MMICs. What is achieved in this way is that the LO signals processed in the MMICs are coherent.

In the example illustrated in FIG. 5, the master MMIC 1 generates the LO signal $s_{LO}(t)$ and distributes it via the LO output of the master MMIC 1 to the slave MMICs 2, 3 and 4, as a result of which a plurality of MMICs can be connected in series (cascaded). The (system) clock signal $s_{CLK}(t)$ can likewise be generated by the master MMIC 1 and distributed to the slave MMICs 2, 3, and 4. In the example illustrated, however, the clock signal $s_{CLK}(t)$ is made available by the system controller 50 and distributed to the MMICs 1-5. The clock signal $s_{CLK}(t)$ can have a clock frequency of a few MHz (e.g. 200 MHz), whereas the LO signal has an LO frequency $f_{LO}$ of a plurality of GHz (e.g. 76-81 GHz). Alternatively, the clock signal can also be generated in a separate clock generator chip, which can contain e.g. a quartz oscillator. In this case, the clock signal $s_{CLK}(t)$ generated by the clock generator chip is fed to all the MMICs (master MMIC 1 and slave MMICs 2-4). In some exemplary embodiments, the master MMIC 1 can also be configured such that it only generates the LO signal $s_{LO}(t)$ for the slave MMICs 2-4 and the transmitting and receiving channels TX01, TX02, RX01, RX02, etc. remain unused (i.e. the transmitting channels are all used as LO outputs). The power splitter 8 is not absolutely necessary if the master MMIC 1 has for each slave MIMIC an LO output assigned thereto.

The system controller 50 is configured to communicate with the MMICs 1-5. For this purpose, the controller 50 and the MMICs 1-5 can be coupled by means of one or more communication connections, for example by means of an SPI bus (Serial Peripheral Interface Bus) and/or by means of LVDS (Low Voltage Differential Signalling). As mentioned, the digital signal processing (cf. FIG. 3, block 40) can be implemented partly in the controller and partly in the MMICs 1-5.

As mentioned, in many applications it is important for the LO signals used in the various MMICs to be coherent, i.e. to have a defined phase relationship to one another. Although the LO signal having an (average) frequency of e.g. 77 GHz can be transmitted from the master MIMIC 1 to the slave MMICs 2-4, the phase of the radar signal $s_{RF}(t)$ emitted by a TX channel of a slave MIMIC is not necessarily constant and stable in relation to the phase of the LO signal $s_{LO}(t)$ at the output of the local oscillator 101 in the master MMIC 1. As mentioned, the emitted radar signals are substantially amplified and phase-shifted versions of the LO signal $s_{LO}(t)$, wherein the phase of the emitted radar signals is dependent on the temperature, in particular. The LO signal $s_{LO}(t)$ is in the range of millimeter waves and, consequently, a temperature-dictated change in the length of the signal path from the master MMIC to the slave MMICs can already result in a significant change in the phase of the LO signals received by the slave MMICs. At a frequency of 77 GHz (i.e. a wavelength of approximately 3.9 mm), a change in the length of the signal path by just 1 μm results in a phase change of approximately 0.1 degree. Furthermore, in particular active components such as e.g. amplifiers and phase shifters can cause a temperature-dependent phase drift. At a frequency of 2.4 GHz, the phase change is then only around 0.003 degree per μm length change. These numerical examples serve merely for illustration and use the assumption that the signals propagate at the speed of light ($c \approx 3 \cdot 10^9$ m/s); the propagation speed through the strip lines on the carrier printed circuit board (or in other waveguides) may actually be significantly lower.

One possibility for handling phase changes is a measurement and subsequent calibration of the phase of the RF radar signals at the output of the TX channels. However, a measurement of the phase requires a reference signal, the phase of which is comparatively stable. In known systems, however, such a reference signal is not available in the slave MMICs, which makes the phase measurement challenging.

Figure 6:
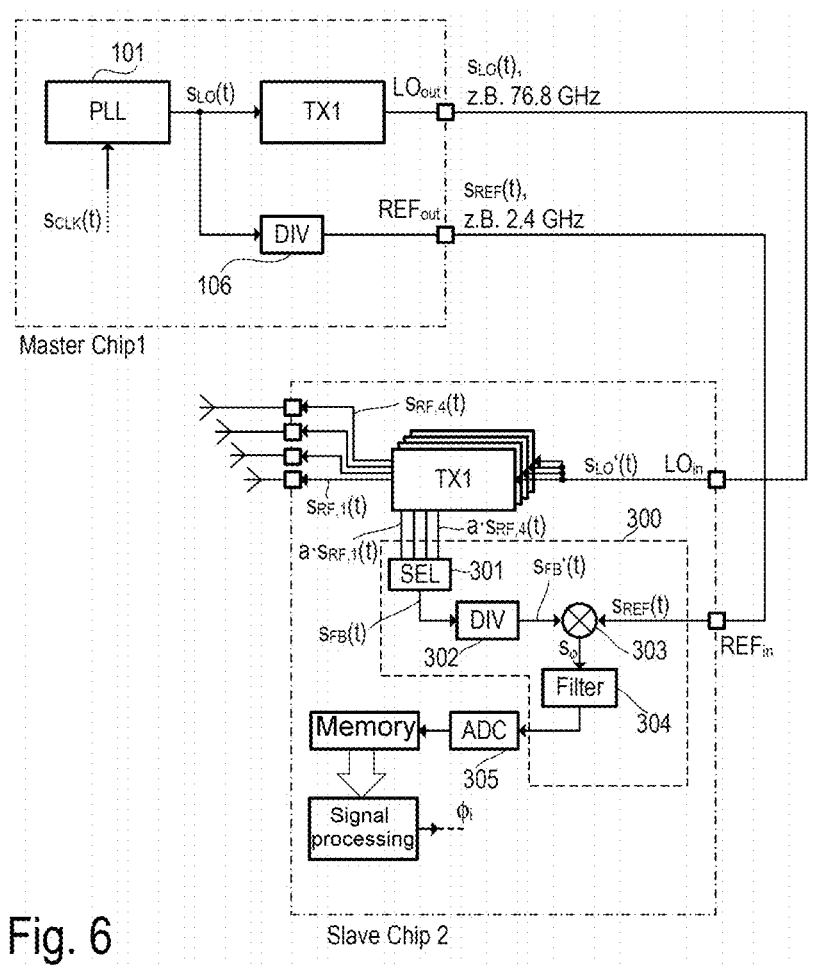
FIGS. 6 to 9 illustrate various examples of a phase measurement in a radar system with a master MMIC and a (at least one) slave MMIC.

FIG. 6 illustrates one example of a system comprising a master MMIC 1 and a slave MIMIC, wherein, for the sake of simplicity, only those components which are relevant to the following discussion are illustrated. In accordance with FIG. 6, the master MMIC 1 comprises a local oscillator 101, which generates an LO signal $s_{LO}(t)$ e.g. with the aid of a phase locked loop on the basis of the clock signal $s_{CLK}(t)$. In the example illustrated, the LO signal $s_{LO}(t)$ is a continuous wave signal (CW signal) having a frequency $f_{LO}$ of e.g. 76.8 GHz. The LO signal $s_{LO}(t)$ is for example output via a TX channel TX1 of the master MIMIC 1 at an RF contact LO$_{out}$ configured as an LO output and is transmitted by means of a waveguide (implemented e.g. by means of strip lines) toward a corresponding LO input LO$_{in}$ of a slave MMIC 2 (directly or indirectly via a splitter). The LO signal received by the slave MIMIC 2 is designated by $s_{LO}'(t)$. The signals $s_{LO}(t)$ and $s_{LO}'(t)$ differ essentially in their phase, which is dependent inter alia on the length of the signal path between the master MIMIC 1 and the slave MMIC 2. On account of the signal damping during transmission, the amplitude of the received signal $s_{LO}'(t)$ is also smaller than the amplitude of the signal $s_{LO}(t)$, but this is not relevant to the further discussion.

In accordance with FIG. 6, the master MMIC 1 furthermore contains a frequency divider 106, the input of which is connected to the output of the local oscillator 101. The frequency divider 106 is configured to divide the frequency of the LO signal $s_{LO}(t)$ by a fixed deviser k, i.e. the frequency divider 106 generates, on the basis of the LO signal $s_{LO}(t)$ a signal $s_{REF}(t)$ having a frequency $f_{REF}$ that is a fraction of the frequency $f_{LO}$ of the LO signal $s_{LO}(t)$ ($f_{REF}=f_{LO}/k$). The divisor k is generally an integer and can be in a range of approximately 4 to 512, in particular of approximately 16 to 128. In the example from FIG. 6, the divisor k is equal to 32, with the result that an LO frequency is reduced from 76.8 GHz to 2.4 GHz. In many exemplary embodiments, the divisor k will be chosen such that the frequency $f_{LO}/k$ is only a few gigahertz, e.g. less than 10 GHz. The reference signal $s_{REF}(t)$ having the reduced frequency of e.g. 2.4 GHz is output at the reference signal output REF$_{out}$ and transmitted via a line toward a corresponding reference signal input REF$_{in}$ of the slave MMIC 2.

The slave MMIC 2 contains a plurality of transmitting channels TX1, TX2, TX3, TX4, to which the LO signal $s_{LO}'(t)$ received at the LO input LO$_{in}$ of the slave MIMIC 2 is fed and which generate the transmission signals $s_{RF,1}(t)$, $s_{RF,2}(t)$, $s_{RF,3}(t)$ and $s_{RF,4}(t)$, respectively, on the basis of the LO signal $s_{LO}'(t)$. The transmitting channels TX1, TX2, TX3, TX4 can be constructed similarly to the transmitting channel in the example illustrated in FIG. 4, the transmitting channels additionally each having a coupler, via which the respective transmission signal $s_{RF,1}(t)$, $s_{RF,2}(t)$, $s_{RF,3}(t)$ and $s_{RF,4}(t)$ is conducted to the antenna port. The couplers are configured to branch off a fraction of the power of the transmission signals $s_{RF,1}(t)$, $s_{RF,2}(t)$, $s_{RF,3}(t)$ and $s_{RF,4}(t)$ and to make the latter available as feedback signals $\alpha \cdot s_{RF,1}$, $\alpha \cdot s_{RF,2}(t)$, $\alpha \cdot s_{RF,3}(t)$ and $\alpha \cdot s_{RF,4}(t)$, respectively. The factor $\alpha$ denotes the insertion loss of the couplers.

In accordance with FIG. 6, the feedback signals $\alpha \cdot s_{RF,1}(t)$, $\alpha \cdot s_{RF,2}(t)$, $\alpha \cdot s_{RF,3}(t)$ and $\alpha \cdot s_{RF,4}(t)$ are fed to a multiplexer unit 301, at the output of which a selected one of the feedback signals $\alpha \cdot s_{RF,1}(t)$, $\alpha \cdot s_{RF,2}(t)$, $\alpha \cdot s_{RF,3}(t)$ and $\alpha \cdot s_{RF,4}(t)$ is made available. The selected feedback signal is designated by $s_{FB}(t)$ in FIG. 6. The multiplexer unit 301 can be implemented in various ways, for example by means of electronic switches. In one simple example, the outputs of the couplers mentioned are connected to a circuit node and the signal $s_{FB}(t)$ at this circuit node represents the transmission signal of the respectively active transmitting channel, only a selected one of the transmitting channels TX1, TX2, TX3, TX4 ever being active. The remaining transmitting channels are inactive in the meantime (e.g. as a result of the deactivation of the amplifier contained in the respective transmitting channel). In a very simple example in which the slave MMIC 2 uses only one transmitting channel TX1, the multiplexer unit 301 can be omitted.

In the example from FIG. 6 the slave MMIC 2 furthermore has a frequency divider 302, the input of which is connected to the output of the multiplexer unit 301. The frequency divider 302 is configured to divide the frequency of the feedback signal $s_{FB}(t)$ by a predetermined divisor, i.e. the frequency divider 302 generates, on the basis of the feedback signal $s_{FB}(t)$ a signal $s_{FB}'(t)$ (modified feedback signal) having a frequency that is a fraction of the frequency of the feedback signal $s_{FB}(t)$. In the examples described here, the divisor of the frequency divider 302 is the same as the divisor k of the frequency divider 106 of the master MIMIC 1. The frequency of the feedback signal $s_{FB}(t)$ corresponds to the LO frequency $f_{LO}$ and the frequency of the modified feedback signal $s_{FB}'(t)$ corresponds to the frequency $f_{REF}=f_{LO}/k$ of the reference signal $s_{REF}(t)$.

The modified feedback signal $s_{FB}'(t)$ and the reference signal $s_{REF}(t)$ fed to the slave MIMIC 2 are fed to the inputs of a mixer 303, which mixes the two signals. The mixer output signal $s_\varphi$ is filtered by means of the filter 304 in order to suppress undesired image frequencies. The filter 304 can substantially have a low-pass filter characteristic. Since the two input signals of the mixer 303 ($s_{REF}(t)$ and $s_{FB}'(t)$) have the same frequency $f_{REF}$, the filtered mixer output signal is substantially a DC voltage signal, the level of which is dependent on the phase $\varphi_{FB}$ of the modified feedback signal $s_{FB}'(t)$ (and thus of the feedback signal $s_{FB}(t)$) relative to the phase of the reference signal $s_{REF}(t)$. The circuit components 301, 302, 303 and 304 (multiplexer unit, mixer, frequency divider and filter) can be regarded as parts of a measuring circuit 300 configured to generate—on the basis of the output signal $s_{RF,1}(t)$ of the transmitting channel TX1 (which is represented by the feedback signal $s_{FB}'(t)$) and the received frequency-divided reference signal $s_{REF}(t)$—the signal $s_\varphi$ indicating a phase angle of the output signal $s_{RF,1}(t)$ of the transmitting channel TX1 relative to the received reference signal $s_{REF}(t)$.

In order to calculate the phase $\varphi_{FB}$ of the feedback signal $s_{FB}(t)$, the filtered mixer output signal can be digitized (analog-to-digital converter 305) and the phase can be calculated digitally. If the signal $\alpha \cdot s_{RF,1}(t)$ branched off from the transmitting channel TX1 was selected as feedback signal, the phase $\varphi_{FB}$ substantially corresponds to the phase $\varphi_1$ of the transmission signal $s_{RF,1}(t)$ of the transmitting channel TX1. Methods for digitally calculating the phase are known per se and will not be explained any further here. One suitable algorithm uses e.g. a fast Fourier transform (FFT). The process described can be repeated for each of the transmitting channels TX1, TX2, TX3 and TX4 of the slave MMIC 2, and, on the basis of the calculated phases $\varphi_1$, $\varphi_2$, $\varphi_3$ and $\varphi_4$, respectively, it is possible to carry out a calibration of the phases, for example by using the phase shifters in the TX channels TX1, TX2, TX3 and TX4 (cf. FIG. 4, phase shifter 103) in order to set the phases $\varphi_1$, $\varphi_2$, $\varphi_3$ and $\varphi_4$, respectively, to a desired value.

In the example from FIG. 6, the mixer 303 operates with the signals $s_{REF}(t)$ and $s_{FB}'(t)$, both of which have the reduced frequency $f_{LO}/k$ (e.g. 2.4 GHz). Alternatively, the mixer can also operate with the full LO frequency $f_{LO}$ (e.g. 76.8 GHz). In this case, the frequency of the feedback signal $s_{FB}(t)$ is not reduced with the aid of a frequency divider, rather the frequency $f_{REF}$ of the reference signal $s_{REF}(t)$ is increased again by a factor k in the slave MMIC 1 by means of a frequency multiplier 302'. One example of this is illustrated in FIG. 7.

Figure 7:
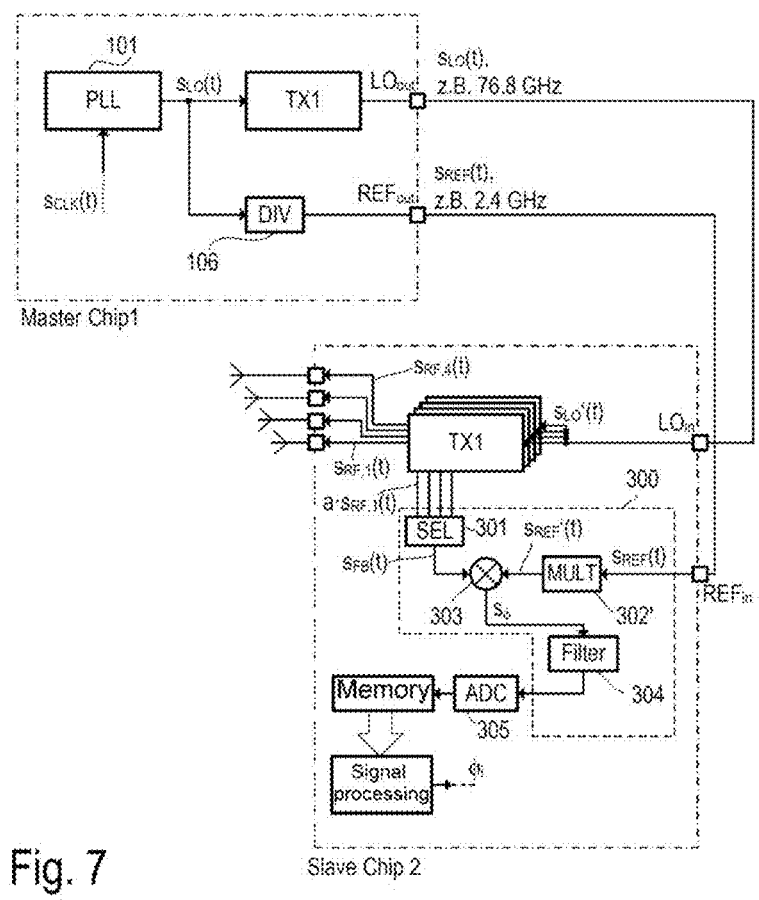

In the example illustrated in FIG. 7, the master MIMIC 1 is identical to that in the previous example from FIG. 6. Both the LO signal $s_{LO}(t)$ (frequency $f_{LO}$) and the reference signal $s_{REF}(t)$ (frequency $f_{REF}=f_{LO}/k$) are transmitted toward the slave MIMIC 2. The slave MMIC 2 from FIG. 7 is constructed very similarly to that in the example from FIG. 6. The sole difference is that—as mentioned above—a frequency multiplier 302' is used instead of the frequency divider 302, said frequency multiplier generating a modified reference signal $s_{REF}'(t)$ on the basis of the reference signal $s_{REF}(t)$ received in the slave MMIC 2, the frequency of which modified reference signal is higher than the frequency $f_{REF}$ by the factor k. The modified reference signal $s_{REF}'(t)$ thus has the frequency $f_{LO}=f_{REF} \cdot k$ and hence the same frequency as the feedback signal $s_{FB}(t)$.

The mixing of the signals $s_{REF}'(t)$ and $s_{FB}(t)$ by the mixer 303 and the subsequent determination of the phases $\varphi_1$, $\varphi_2$, $\varphi_3$ and $\varphi_4$ are effected in the same way as in the previous example from FIG. 6, and reference is made to the description above. The sole difference is that the mixer 303 operates with a higher frequency. In this example, too, the measuring circuit 300 is configured to generate—on the basis of the output signal $s_{RF,1}(t)$ of the transmitting channel TX1 (said output signal being represented by the selected feedback signal $s_{FB}(t)$) and the received frequency-multiplied reference signal $s_{REF}'(t)$—the signal $s_\varphi$ indicating a phase angle of the output signal $s_{RF,1}(t)$ of the transmitting channel TX1 relative to the received reference signal $s_{REF}(t)$.

Even though only one slave MMIC 2 is illustrated in the examples from FIGS. 6 and 7, the system—in a manner similar to that in the example from FIG. 5—can comprise a plurality of slave MMICs, wherein the reference signal $s_{REF}(t)$ is transmitted to all the slave MMICs and all the slave MMICs comprise a frequency divider (as in FIG. 6) or a frequency multiplier (as in FIG. 7). The mixing of the frequency-divided feedback signal $s_{FB}'(t)$ with the reference signal $s_{REF}(t)$ or the mixing of the feedback signal $s_{FB}(t)$ with the frequency-multiplied reference signal $s_{REF}'(t)$ takes place in the respective slave MMICs.

Figure 8:
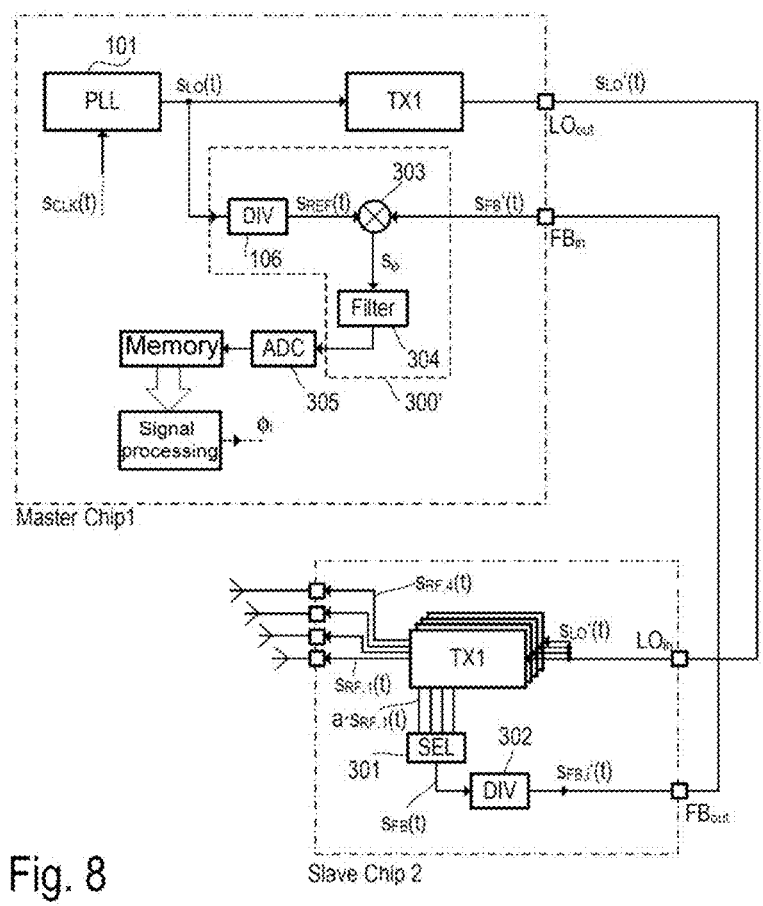

FIG. 8 illustrates an alternative example in which the mixer 303 is integrated in the master MMIC 1 and the mixing of the frequency-divided feedback signal $s_{FB}'(t)$ with the reference signal $s_{REF}(t)$ is effected in the master MMIC 1. As in the previous example from FIG. 6, by means of the local oscillator 101 in the master MMIC 1 the LO signal $s_{LO}(t)$ is generated and output via a transmitting/output channel at an LO output $LO_{out}$ of the master MMIC and transmitted toward a corresponding LO input $LO_{in}$ of the slave MIMIC 2 (directly or indirectly via a splitter). The LO signal received by the slave MMIC 2 is designated by $s_{LO}'(t)$ as in FIGS. 6 and 7. The signals $s_{LO}(t)$ and $s_{LO}'(t)$ essentially differ in their phase, which is dependent inter alia on the length of the signal path between the master MMIC 1 and the slave MMIC 2. On account of the signal damping during transmission, the amplitude of the received signal $s_{LO}'(t)$ is also smaller than the amplitude of the signal $s_{LO}(t)$, but this is not relevant to the further discussion. In accordance with FIG. 8, the master MIMIC 1 furthermore contains a frequency divider 106, the input of which is connected the output of the local oscillator 101. The frequency divider 106 is configured to divide the frequency of the LO signal $s_{LO}(t)$ by a fixed divisor k, i.e. the frequency divider 106 generates on the basis of the LO signal $s_{LO}(t)$ a signal $s_{REF}(t)$ having a frequency $f_{REF}$ that is a fraction of the frequency $f_{LO}$ of the LO signal $s_{LO}(t)$ ($f_{REF}=f_{LO}/k$). With regard to the reference signal, reference is made to the above explanations concerning FIGS. 6 and 7.

The slave MIMIC 2 comprises a multiplexer unit 301, at the output of which a selected one of the feedback signals $\alpha \cdot s_{RF,1}(t)$, $\alpha \cdot s_{RF,2}(t)$, $\alpha \cdot s_{RF,3}(t)$ and $\alpha \cdot s_{RF,4}(t)$ of the transmitting channels TX1, TX2, TX3 and TX4, respectively, is made available. The selected feedback signal is designated by $s_{FB}(t)$ in FIG. 8. With regard to the feedback signals $\alpha \cdot s_{RF,1}(t)$, $\alpha \cdot s_{RF,2}(t)$, $\alpha \cdot s_{RF,3}(t)$ and $\alpha \cdot s_{RF,4}(t)$ of the transmitting channels TX1, TX2, TX3 and TX4, respectively, reference is likewise made to the above description concerning FIGS. 6 and 7. The feedback signal $s_{FB}(t)$ output by the multiplexer unit is fed to the frequency divider 302, which outputs a correspondingly modified (frequency-divided) feedback signal $s_{FB}'(t)$. In this regard, the example from FIG. 8 does not differ from the previous examples. Unlike in the previous examples, however, in the example from FIG. 8 the reference signal $s_{REF}(t)$ is not transmitted from the master MMIC 1 to the slave MMIC 2, rather the frequency-divided feedback signal $_{SFB}'(t)$ having a frequency of $f_{REF}=f_{LO}/k$ is output by the slave MMIC 2 at an output $FB_{out}$ and transmitted toward a corresponding input $FB_{in}$ of the master MMIC 1.

In the master MMIC 1, the received frequency-divided feedback signal $s_{FB}'(t)$ and the reference signal $s_{REF}(t)$ are mixed (see FIG. 8, mixer 303) and the mixer output signal $s_\varphi$ is fed to a filter 304, which substantially carries out low-pass filtering in order to suppress image frequencies. As in the previous examples from FIGS. 6 and 7, the filtered mixer output signal is digitized and the phase is ascertained by means of digital signal processing. Since the two input signals of the mixer 303 ($s_{REF}(t)$ and $s_{FB}'(t)$) have the same frequency $f_{REF}$, the filtered mixer output signal is substantially a DC voltage signal, the level of which is dependent on the phase $\varphi_{FB}$ of the modified feedback signal $s_{FB}'(t)$ (and thus of the feedback signal $s_{FB}(t)$) relative to the phase of the reference signal $s_{REF}(t)$. Regarding the calculation of the phases $\varphi_1$, $\varphi_2$, $\varphi_3$ and $\varphi_4$ and the subsequent calibration of these phases by means of the phase shifters arranged in the TX channels TX1, TX2, TX3 and TX4 (cf. FIG. 4, phase shifter 103), reference is made to the above description concerning FIGS. 6 and 7.

The circuit components 106, 303 and 304 (mixer, frequency divider and filter) can be regarded as parts of a measuring circuit 300' configured to generate—on the basis of the local oscillator signal $s_{LO}(t)$ (frequency-divided in the example from FIG. 8) and the received frequency-divided feedback signal $s_{FB}'(t)$—a signal $s_\varphi$ indicating a phase angle of the received frequency-divided feedback signal $s_{FB}'(t)$ relative to the local oscillator signal $s_{LO}(t)$.

Figure 9:
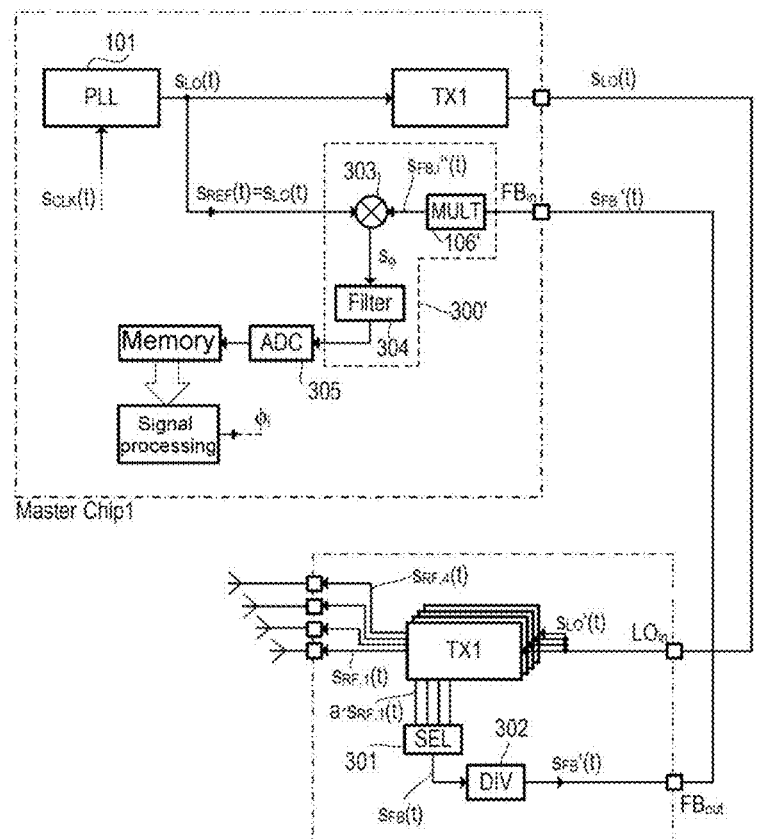

In the example from FIG. 9, the mixer 303—as in the example from FIG. 7—operates with the high frequency $f_{LO}$ instead of at the lower frequency $f_{LO}/k$. For this reason, in accordance with FIG. 9, in the master MMIC 2 the frequency divider 106 (used in the example from FIG. 8) is omitted and a frequency multiplier 106' is used instead in order that the frequency of the feedback signal $s_{FB}'(t)$ received by the master MMIC 1 is increased again to the original LO frequency $f_{LO}$. That is to say that the frequency multiplier 106' is configured to reestablish the feedback signal having the original frequency $f_{LO}$ on the basis of the frequency-divided feedback signal $s_{FB}'(t)$ received in the master MMIC 1. The output signal of the frequency multiplier 106' is designated by $s_{FB}''(t)$.

In this case, the mixer 303 mixes the LO signal $s_{LO}(t)$, which simultaneously serves as a reference signal, with the output signal $s_{FB}''(t)$ of the frequency multiplier 106'. The mixer output signal $s_\varphi$ is processed in the same way as in the previous examples, and reference is made to the explanations in this regard further above. In this example, the measuring circuit 300' is configured to generate—on the basis of the local oscillator signal $s_{LO}(t)$ and the received frequency-multiplied feedback signal $s_{FB}''(t)$—a signal $s_\varphi$ indicating a phase angle of the received frequency-divided feedback signal $s_{FB}'(t)$—relative to the local oscillator signal $s_{LO}(t)$.

What all the examples have in common is that between the master MMIC 1 and the slave MMIC 2 there are transmitted both the LO signal $s_{LO}(t)$ (frequency $f_{LO}(t)$ and a further signal ($s_{REF}(t)$ or $s_{FB}'(t)$), which is dependent on the LO signal $s_{LO}(t)$ but has a lower frequency $f_{LO}/k$ generated by means of a frequency divider. On account of the lower frequency $f_{LO}/k$, the phase shift and in particular the change/drift of the phase shift along the signal path from the master MMIC 1 to the slave MMIC 2 (or vice versa) are significantly lower and the transmitted signal having the lower frequency $f_{LO}/k$ can be used for a comparatively accurate phase measurement. Furthermore, only few, ideally no, active components that could bring about an appreciable temperature-dependent phase drift are situated between the frequency divider 106 and the mixer 303 (see FIG. 6), the frequency divider 302 and the mixer 303 (see FIG. 8) and between the frequency divider 106 and the frequency multiplier 302' (see FIG. 7) or the frequency divider 302 and the frequency multiplier 106' (see FIG. 9).

In systems having a multiplicity of slave MMICs, the frequency dividers 302 used in the individual slave MMICs would have to be synchronized. Suitable measures for synchronization are known per se. In the system from FIG. 7, no frequency dividers are used in the slave MMICs since instead the frequency of the received reference signal $s_{REF}(t)$ is increased again to the value $f_{LO}$ with the aid of the frequency multiplier. Synchronization is not necessary in this case.

Figure 10:
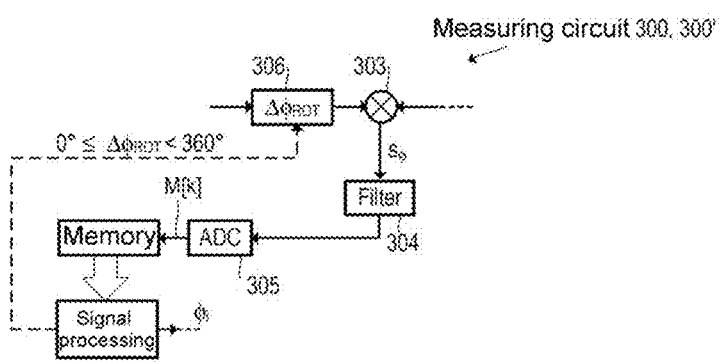
FIGS. 10 and 11 schematically illustrate one example of a phase measurement.
Figure 11:
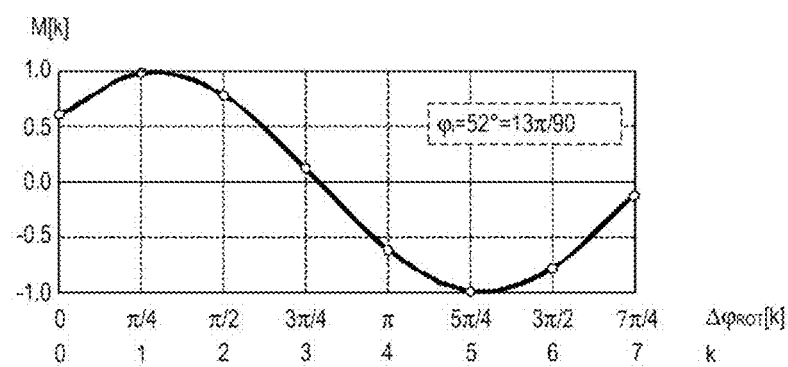

In the examples described here, the output signal of the mixer 303 and thus also the (analog) output signal of the measuring circuit 300 (see FIGS. 6-8) and respectively 300' (see FIGS. 9-10) is a DC (direct current) signal since, after all, both RF input signals of the mixer 303 have the same frequency. The output signal of the measuring circuit 300, 300' is digitized, and one phase representing the phase difference between the two RF input signals of the mixer 303 can be calculated on the basis of the digital signal. In ideal components, a single sample of the output signal of the measuring circuit 300, 300' would suffice for a phase measurement. FIGS. 10 and 11 illustrate a more robust approach for measuring the phase on the basis of the output signal of the measuring circuit 300, 300'.

FIG. 10 illustrates the measuring circuit 300, 300' from the previous examples with an additional phase shifter 306, which is connected upstream of one of the RF inputs of the mixer 303 in order to shift the relevant RF input signal 303 by an additional phase shift $\Delta\varphi_{ROT}$. The phase shifter 306 can be implemented by means of an IQ modulator, for example. In this case, rather than a single measurement value being recorded (which, as mentioned, would suffice for the phase calculation in the case of ideal circuit components), a sequence of measurement values M[k] is recorded, for example K=8 measurement values M[0], M[1], M[2], M[3], M[4], M[5], M[6], M[7], wherein between the detection of the individual measurement values M[k] the phase shift $\Delta\varphi_{ROT}$ is increased step by step, while the situation does not change apart from that. In the case of a sequence of eight measurement values M[k], that means $\Delta\varphi_{ROT}=k\pi/4$ rad=360°·k/8. FIG. 11 illustrates by way of example the measurement values M[0] to M[7], which theoretically lie on a sine curve, the phase angle of which, even in the presence of noise, can be determined relatively simply by means of digital signal processing. One numerically efficient method for this is e.g. the fast Fourier transform (FFT). The signal-to-noise ratio becomes all the better, the longer the sequence chosen (e.g. 128 measurement values instead of 8).

The point in the circuit at which the phase shifter 306 is arranged is of little significance for the calculation of the phase. For an application of the FFT however it is advantageous for the phase $\Delta\phi_{ROT}$ to be incremented step by step by one or more whole "revolutions". For an efficient implementation of the FFT, it is additionally advantageous if the number of measurement values of a sequence is a power of two, i.e. $K=2^p$ (for $p=1, 2, \ldots$). Finally, it should also be pointed out that the specific method according to which a phase is calculated from the digitized output signal of the measuring circuit is not important for the exemplary embodiments described here and the description is not limited to a specific method of calculating the phase.

What is claimed is:

1. A radar system, comprising:
a first radar chip comprising a local oscillator comprising a first output, the local oscillator is configured to provide a local oscillator signal at the first output;
a first frequency divider contained in the first radar chip and comprising a second output, the first frequency divider being coupled to the first output of the local oscillator and being configured to provide a frequency-divided signal based on the local oscillator signal at the second output; and
a second radar chip comprising:
a first input coupled to the first output and configured to receive the local oscillator signal from the first output of the first radar chip;
a second input coupled to the second output and configured to receive the frequency-divided signal from the second output of the first radar chip;
an output channel, to which the local oscillator signal received at the first input is fed, configured to generate an output signal based on the local oscillator signal; and
a circuit configured to generate, based on the output signal of the output channel and the received frequency-divided signal, a phase angle signal indicating a phase angle of the output signal relative to the received frequency-divided signal.

2. The radar system as claimed in claim 1, wherein the circuit further comprises:
a second frequency divider configured to generate a frequency-divided feedback signal based on a feedback signal representing the output signal of the output channel; and
a mixer configured to mix the frequency-divided feedback signal and the received frequency-divided signal, wherein the phase angle signal indicating the phase angle of the output signal relative to the received frequency-divided signal is provided at an output of the mixer.

3. The radar system as claimed in claim 2, wherein:
the output channel comprises a coupler configured to couple out the feedback signal as a portion of the output signal.

4. The radar system as claimed in claim 1, wherein the circuit further comprises:
a frequency multiplier configured to generate a modified signal based on the received frequency-divided signal; and
a mixer configured to mix a feedback signal representing the output signal of the output channel and the modified signal, wherein the phase angle signal indicating the phase angle of the output signal relative to the received frequency-divided signal is provided at an output of the mixer.

5. The radar system as claimed in claim 3, wherein:
the output channel comprises a coupler configured to couple out the feedback signal as a portion of the output signal.

6. A radar system, comprising:
a first radar chip comprising a local oscillator having a first output, the local oscillator is configured to provide a local oscillator signal at the first output; and
a second radar chip comprising:
a first input configured to receive the local oscillator signal from the first radar chip;
an output channel, to which the local oscillator signal received at the first input is fed, configured to generate an output signal;
a first frequency divider configured to generate a frequency-divided signal based on the output signal of the output channel; and
a second output configured to transmit the frequency-divided signal to the first radar chip,
wherein the first radar chip further comprises:
a second input configured to receive the frequency-divided signal from the second radar chip; and
a circuit configured to generate, based on the local oscillator signal and the received frequency-divided signal, a phase angle signal indicating a phase angle of the received frequency-divided signal relative to the local oscillator signal.

7. The radar system as claimed in claim 6, wherein the circuit further comprises:
a second frequency divider configured to generate a frequency-divided local oscillator signal based on the local oscillator signal; and
a mixer configured to mix the frequency-divided local oscillator signal and the received frequency-divided signal, wherein the phase angle signal indicating the phase angle of the received frequency-divided signal relative to the local oscillator signal is provided at an output of the mixer.

8. The radar system as claimed in claim 7, wherein:
the output channel comprises a coupler configured to couple out a feedback signal as a portion of the output signal, wherein the feedback signal is representative of the output signal and is fed to an input of the first frequency divider,
the first frequency divider configured to frequency divide the feedback signal to generate the frequency-divided signal.

9. The radar system as claimed in claim 6, wherein the circuit further comprises:
a frequency multiplier configured to generate a modified signal based on the received frequency-divided signal; and
a mixer configured to mix a feedback signal, the local oscillator signal and the modified signal wherein the phase angle signal indicating the phase angle of the received frequency-divided signal relative to the local oscillator signal is provided at an output of the mixer.

10. The radar system as claimed in claim 9, wherein:
the output channel comprises a coupler configured to couple out a feedback signal as a portion of the output signal as a feedback signal, which wherein the feedback signal is representative of the output signal and is fed to an input of the first frequency divider, and
the first frequency divider configured to frequency divide the feedback signal to generate the frequency-divided signal.

11. A method, comprising:
generating a local oscillator signal in a first radar chip;
generating a frequency-divided signal from the local oscillator signal by a frequency divider arranged in the first radar chip;
transmitting the frequency-divided signal to a second radar chip;
transmitting the local oscillator signal to the second radar chip, wherein the frequency-divided signal and the local oscillator signal are simultaneously received at separate inputs of the second radar chip, and wherein the local oscillator signal received by the second radar chip is fed to an output channel of the second radar chip;
generating an output signal, by the output channel, based on the local oscillator signal fed to the output channel of the second radar chip; and
generating, based on the output signal of the output channel and the frequency-divided signal received by the second radar chip, a phase angle signal indicating a phase angle of the output signal relative to the received frequency-divided signal.

12. A method, comprising:
generating a local oscillator signal in a first radar chip;
transmitting the local oscillator signal to a second radar chip, wherein the local oscillator signal received by the second radar chip is fed to an output channel of the second radar chip;
generating an output signal, by the output channel, based on the local oscillator signal;
generating a frequency-divided signal based on the output signal of the output channel by a frequency divider arranged in the second radar chip;
transmitting the frequency-divided signal to the first radar chip; and
generating, based on the frequency-divided signal received by the first radar chip and the local oscillator signal, a phase angle signal indicating a phase angle of the received frequency-divided signal relative to the local oscillator signal.

13. The radar system as claimed in claim 1, wherein the first frequency divider is configured to frequency-divide the local oscillator signal to generate the frequency-divided signal and provide the frequency-divided signal to the second input of the second radar chip via the second output.

14. The radar system as claimed in claim 1, wherein the output channel is a transmission channel configured to be coupled to a transmission antenna for emitting the output signal as a transmission signal.

15. The radar system as claimed in claim 14, wherein:
the output channel comprises a coupler configured couple out a portion of the output signal as a feedback signal, wherein the feedback signal is representative of the output signal, and
the circuit is configured to generate, based on the feedback signal and the received frequency-divided signal, the phase angle signal indicating the phase angle of the output signal relative to the received frequency-divided signal.

16. The radar system as claimed in claim 15, wherein the circuit further comprises:
a second frequency divider configured to frequency-divide the feedback signal to generate a frequency-divided feedback signal; and
a mixer configured to mix the frequency-divided feedback signal and the received frequency-divided signal to generate the phase angle signal.

17. The radar system as claimed in claim 15, wherein the circuit further comprises:
a frequency multiplier configured to multiply a frequency of the received frequency-divided signal to generate a modified signal; and
a mixer configured to mix the feedback signal and the modified signal to generate the phase angle signal.

18. The radar system as claimed in claim 15, wherein the first frequency divider is configured to frequency-divide the local oscillator signal to generate the frequency-divided signal and provide the frequency-divided signal to the second input of the second radar chip via the second output.

19. The radar system as claimed in claim 6, wherein the output channel is a transmission channel configured to be coupled to a transmission antenna for emitting the output signal as a transmission signal.

20. The radar system as claimed in claim 19, wherein the circuit further comprises:
a second frequency divider configured to frequency-divide the local oscillator signal to generate a frequency-divided local oscillator signal; and
a mixer configured to mix the frequency-divided local oscillator signal and the received frequency-divided signal to generate the phase angle signal.

21. The radar system as claimed in claim 20, wherein:
the output channel comprises a coupler configured to couple out a feedback signal as a portion of the output signal, wherein the feedback signal is representative of the output signal and is fed to an input of the first frequency divider,
the first frequency divider configured to frequency divide the feedback signal to generate the frequency-divided signal.

22. The radar system as claimed in claim 19, wherein the circuit further comprises:
a frequency multiplier configured to multiply a frequency of the received frequency-divided signal to generate a modified signal; and
a mixer configured to mix the local oscillator signal and the modified signal to generate the phase angle signal.

23. The radar system as claimed in claim 22, wherein:
the output channel comprises a coupler configured to couple out a feedback signal as a portion of the output signal, wherein the feedback signal is representative of the output signal and is fed to an input of the first frequency divider,
the first frequency divider configured to frequency divide the feedback signal to generate the frequency-divided signal.

24. The radar system as claimed in claim 6, wherein the first radar chip is a master radar chip and the second radar chip is a slave radar chip.

* * * * *